United States Patent [19]

Lanzer

[11] Patent Number: 4,672,861
[45] Date of Patent: Jun. 16, 1987

[54] DRIVE SYSTEM FOR AUTOMOBILES HAVING TWO DRIVEN AXLES

[75] Inventor: Heribert Lanzer, Goessendorf, Austria

[73] Assignee: Steyr-Daimler-Puch AG, Vienna, Austria

[21] Appl. No.: 786,662

[22] Filed: Oct. 11, 1985

[30] Foreign Application Priority Data

Oct. 12, 1984 [AT] Austria ................................ 3253/84

[51] Int. Cl.⁴ ............................................. F16H 37/00
[52] U.S. Cl. ................................. 74/665 GE; 74/689; 74/681; 74/710.5
[58] Field of Search ...................... 74/681, 689, 710.5, 74/665 GE, 677; 474/28, 18

[56] References Cited

U.S. PATENT DOCUMENTS

| | | | |
|---|---|---|---|
| 2,611,442 | 9/1952 | Thomas | 180/6.2 |
| 2,874,790 | 2/1959 | Hennessey | 180/6.2 |
| 3,420,121 | 1/1969 | Stieg | 74/714 |
| 4,290,320 | 9/1981 | Abbott | 74/689 |
| 4,393,731 | 7/1983 | Croswhite et al. | 74/689 |
| 4,458,559 | 7/1984 | Croswhite et al. | 74/689 |
| 4,553,450 | 11/1985 | Gizard | 74/681 |
| 4,584,909 | 4/1986 | Abo et al. | 474/28 |

FOREIGN PATENT DOCUMENTS

| | | | |
|---|---|---|---|
| 0071801 | 2/1983 | European Pat. Off. | 474/28 |
| 0105515 | 4/1984 | European Pat. Off. | 74/689 |
| 2319961 | 11/1974 | Fed. Rep. of Germany . | |
| 3338379 | 4/1984 | Fed. Rep. of Germany . | |
| 0049456 | 5/1981 | Japan | 74/689 |

*Primary Examiner*—Allan D. Herrmann
*Assistant Examiner*—Martin G. Belisario
*Attorney, Agent, or Firm*—Marmorek, Guttman & Rubenstein

[57] ABSTRACT

In a drive system for automobiles having two driven axles, a differential gearing between the axles serves at the same time as distributor gearing. A fluid friction clutch is associated with the differential gearing as an optional differential lock thereof. In order to guarantee that the distribution of the driving torques to the two axles can be changed either arbitrarily by hand or automatically on the basis of various operational data, each of the two parts of the fluid friction clutch, adapted for being coupled with each other, is driven from one of two output members of the differential gearing. A preferably continuously adjustable change-speed gearing is associated with one of the two output members. At least one piston drive for acting upon the change-speed gearing and a control unit lodged in an actuating line for the piston drive, as well as a governor for processing operational data of the vehicle or the engine thereof can also be provided.

6 Claims, 1 Drawing Figure

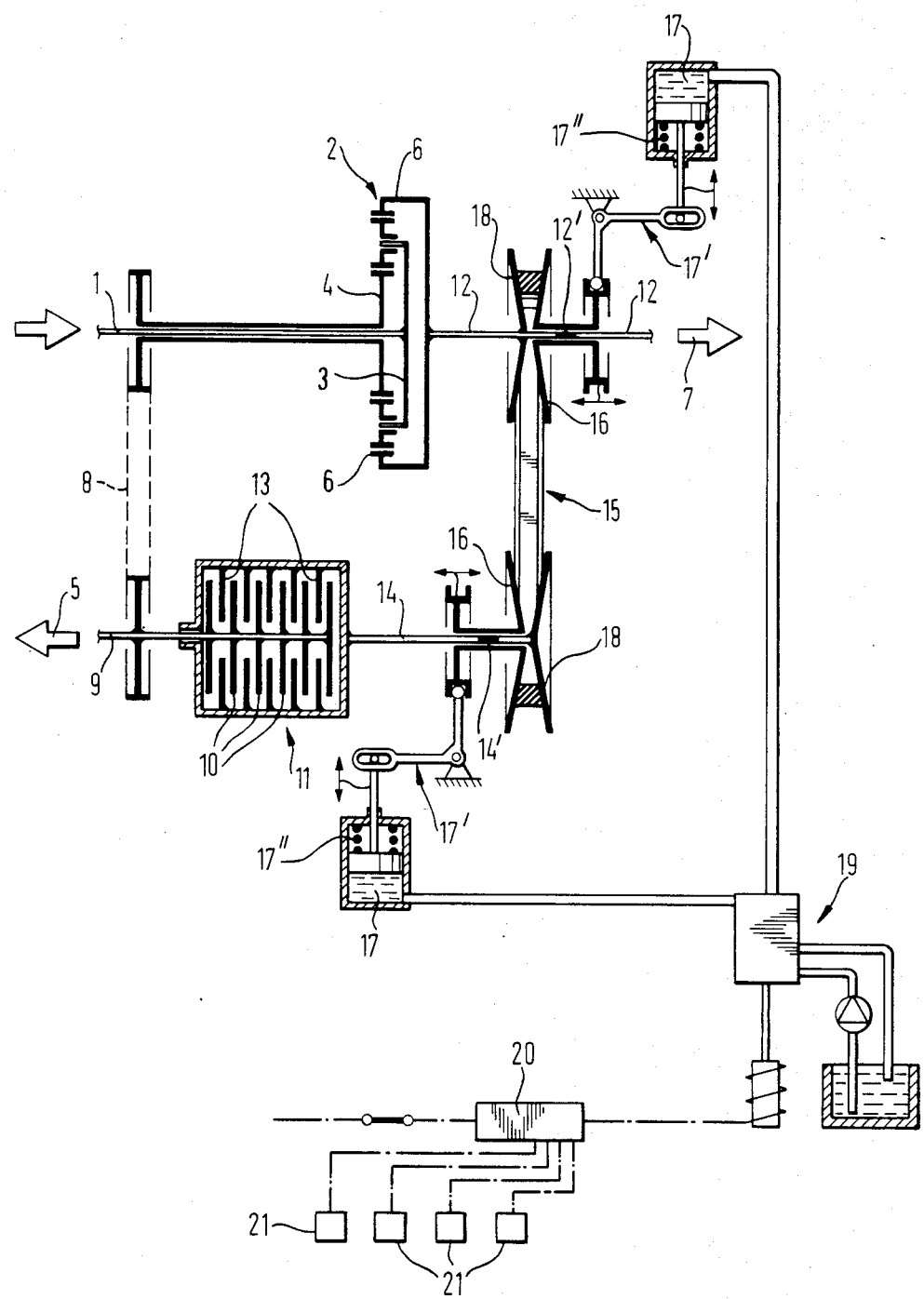

4,672,861

DRIVE SYSTEM FOR AUTOMOBILES HAVING TWO DRIVEN AXLES

BACKGROUND OF THE INVENTION

This invention relates to a drive system for automobiles having two driven axles as well as a differential gearing serving as distributor gearing between these axles, with the differential gearing having a fluid friction clutch associated therewith as an optional differential lock.

The driving torque is distributed by the distributor gearing in a determined ratio to the two axles while at the same time affording the required difference between the speeds of the two axles when traveling through a curve, as the distributor gearing also acts as a differential gearing. The distribution of the driving torque is of substantial influence on the driving performance of the vehicle. As, in the known constructions, the distribution ratio can not be changed, the distribution of the driving torque achieved by the distributor gearing can only be optimal for a determined load condition.

The fluid friction clutch associated with the differential gearing consists of internal and external clutch disks which are connected firmly with corresponding disk carriers for rotation therewith and are lodged in a closed housing which is filled with a liquid of high viscosity. The two parts to be coupled of this fluid friction clutch, i.e., the inner and outer clutch disks or their disk carriers, respectively, have up to now been connected firmly with the driven or the driving members, respectively, of the differential gearing, for rotation therewith. Whenever a relative motion occurs between these driving or driven members, respectively, of the differential gearing, then a friction torque is opposed thereto by the fluid friction clutch, the size of which torque depends on the speed difference. This friction torque will then exert a locking effect on that respective driving or driven member of the differential gearing which turns faster. This represents an automatic differential lock which does not influence the transmission ratio within the differential gearing constituting simultaneously the distributor gearing. The driving torque of the two axles is influenced by the fluid friction clutch toward a rigid drive connection. Such automatic differential locks suffer from the drawback that they change the distribution of torque in an undesirable manner in the case of differences between the diameters of the wheels on the two axles due, for instance, to snow chains on the wheels of an axle, in which case the differential locks may become excessively heated, resulting in a rigid connection. Finally, the automatic lock also occurs when different speeds of the two axles result from traveling in a curve, although, particularly in this case, the effect of the differential gearing acting as a distributor gearing would be most desirable.

It is also known from the German Offenlegungsschrift No. 32 12 495 to associate with a differential gearing a lock formed by a simple friction or disk clutch, and using in this case, as controlling characteristic magnitude, for the coupling starter of this clutch, either the engine torque, the negative pressure in the suction tube, the position of the accelerator pedal, the steering power, the steering angle, the braking force, the axial load distribution, the wheel slippage, the traveling speed and/or the position of the gear shift lever of the gearing. In doing so, it may be sufficient to only engage or disengage the gearing lock, while only influencing the distribution of the driving torque to the two driven axles in a limited manner, quite apart from the fact that it is not possible to effect a distribution of the driving torque independently of the prevailing load on the respective axle.

OBJECTS AND SUMMARY OF THE INVENTION

The invention, therefore, solves the task of eliminating the above-stated drawbacks and to provide a drive system of the above-described kind in which, in accordance with the invention, the distribution of the driving torque on the two axles can be varied in a random manner, either arbitrarily by hand, or automatically on the basis of various operational data, while it is also possible to provide for the usual differential gear lock.

The above-defined task is solved in accordance with the invention by the provision of driving the two parts of the fluid friction clutch to be coupled with each other each by way of one of the two driven members of the differential gearing, and there is provided for one of these drives a preferably continuously shiftable change-speed gearing.

Thus, the speed of one of the two coupling parts of the fluid friction clutch can be very considerably varied with the aid of the change-speed gearing, and this in such a manner that this part either leads or trails the other part. This results in a torque flow between the two parts to be coupled directed to one side or the opposite side, i.e., the torque imparted by the distributor gearing to one of the axles is either imparted solely to this axle, or it is transmitted at least partially via the fluid friction clutch to the other axle which is acted upon by the distributor gearing. Hence, depending on the chosen transmission ratio in the change-speed gearing, it becomes possible to distribute the total torque, delivered by the engine, in spite of the fixed transmission ratio in the distributor gearing, to the two axles differently and independently of the axle loads. However, there also exists the possibility to employ the fluid friction clutch as in the past, as a mere lock for the distributor gearing which is serving at the same time as differential gearing, while it is also possible to remove the lock when an equalization is required in traveling in a curve or the like, as the speed difference of the two parts to be coupled, of the fluid friction clutch, can be reduced even to zero with the aid of the change-speed gearing.

It is particularly advantageous to provide at least one piston drive by means of which the change-speed gearing can be shifted in a manner known per se; the activating line of this piston drive leads via a control unit which can be optionally actuated by a governor adapted for processing the operational data of the vehicle or the vehicle engine, respectively. In this case, an exact adaptation of the torque distribution, and of the optional function of the fluid friction clutch as a differential lock, to the prevailing operational conditions or, respectively to the traveling behavior of the vehicle, is achieved with comparatively simple technical means.

A particularly advantageous construction, which does not require an excessive technical investment, is achieved by devising the change-speed gearing as a continuously adjustable cone pulley looping (chain or belt) transmission.

BRIEF DESCRIPTION OF THE DRAWINGS

The invention will be explained more in detail hereinafter having reference to the accompanying drawing which illustrates a preferred embodiment of the drive system according to the invention.

DETAILED DESCRIPTION OF THE EMBODIMENT SHOWN IN THE DRAWING

The engine (not shown) of an automobile which is provided with two driven axles drives a differential gearing 2 serving at the same time as distributor gearing, via a shaft 1. In doing so, the shaft 1 is firmly connected with a satellite carrier 3 for rotation therewith, and the drive of a first vehicle axle 5 is derived from the central sun gear 4, while the drive for the second axle 7 is derived from the annular gear or outside gear ring 6. Both axles 5 and 7 are indicated only as arrows. The sun gear 4 is drivingly connected by means of a simple belt- or chain-transmission 8 with the shaft 9 which is in turn connected with the first axle 5 for rotation therewith. The shaft 9 is also connected firmly with internal disks 10 of a fluid friction clutch 11 for rotation therewith. Between the shaft 12 leading from the annular, internally threaded gear or outside gear ring 6 to the second vehicle axle 7 and the shaft 14 associated with the external disks 13 of the fluid friction clutch 11, there is provided a continuously shiftable cone-pulley looping (e.g. belt or chain) transmission 15. The conic disks 16 of this cone-pulley looping transmission 15 each of which is axially displaceable, are mutually adjustable by the same distance in opposite direction with the aid of hydraulic piston drives 17 and linkage members 17', i.e., a first conic disk 16 is moved away from its associated stationary conic disk 18 by a distance proportionate with the length by which the displaceable disk 16 mounted on the other shaft is moved nearer to its associated stationary disk 18. Of course, the conic disks 16 and 18 are connected with the respective shafts 12 and 14 bearing them firmly for rotation therewith, e.g. by means of groove-and-tongue joints 12' and 14', respectively, while being axially displaceable thereon.

The two hydraulic piston-cylinder drives 17 are acted upon by a common control unit 19 which can either be actuated by hand as desired, or can be adjusted by means of a governor unit 20 which processes various operational data of the vehicle or vehicle engine being detected by sensors 21.

When braking or in the case of a failure of the system of the governor unit 20 or the control unit 19, respectively, the piston-cylinder drives 17 are without pressure and the conic disks will be separated by a spring element 17''. The clutch 11 then has no function in the operation. The two axles 5 and 7 are without a connection equalizing their speeds. The drive system is thus suitable for use as an ABS (antiblocking) system.

I claim:

1. A drive system for an automotive vehicle having two driven axles, comprising
   a differential gearing having two output members, each of said output members operatively connected to said driven axles respectively to distribute torque to said driven axles,
   a fluid friction clutch having first and second parts coupled to each other, said first part being driven by said first output member, said second part being driven by said second output member, said first and second parts receiving input from said first and second output members at all times, and
   a change speed gearing disposed between one of said output members and its associated clutch part,
   whereby said fluid friction clutch is actuable as a differential lock for said differential gearing, and the ratio of torque distributed to said two driven axles is adjustable.

2. The drive system of claim 1, wherein said change-speed gearing is continuously shiftable.

3. The drive system of claim 1, further comprising at least one piston drive adapted for acting upon said change-speed gearing and a control unit for actuating said piston drive.

4. The drive system of claim 3, wherein said control unit comprises governor means adapted for processing operational data of said vehicle or an engine thereof.

5. The drive system of claim 3, wherein said change-speed gearing is a continuously adjustable cone-pulley equipped looping transmission.

6. The drive system of claim 1 wherein said first output member is operatively connected to said first driven axle via a first shaft, one end of said first shaft being connected to said first driven axle, the other end of said first shaft being connected to said first part of said fluid friction clutch, and wherein said second output member is operatively connected to said second driven axle via a second shaft, one end of said second shaft being connected to said second driven axle, the other end of said second shaft being connected to said second part of said fluid friction clutch via said change speed gearing.

* * * * *